United States Patent
Kreiner et al.

(10) Patent No.: US 11,670,014 B2
(45) Date of Patent: Jun. 6, 2023

(54) AUGMENTED REALITY PERMISSION ZONES

(71) Applicant: AT&T Intellectual Property I, L.P., Atlanta, GA (US)

(72) Inventors: Barrett Kreiner, Woodstock, GA (US); James Pratt, Round Rock, TX (US); Adrianne Binh Luu, Atlanta, GA (US); Robert T. Moton, Jr., Alpharetta, GA (US); Walter Cooper Chastain, Atlanta, GA (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/492,064

(22) Filed: Oct. 1, 2021

(65) Prior Publication Data
US 2023/0105481 A1    Apr. 6, 2023

(51) Int. Cl.
| | |
|---|---|
| *G06T 11/00* | (2006.01) |
| *G06F 3/01* | (2006.01) |
| *G02B 27/01* | (2006.01) |
| *G06F 21/44* | (2013.01) |
| *G06Q 10/02* | (2012.01) |

(52) U.S. Cl.
CPC .......... *G06T 11/00* (2013.01); *G02B 27/0172* (2013.01); *G06F 3/012* (2013.01); *G06F 21/44* (2013.01); *G02B 2027/0178* (2013.01); *G06Q 10/02* (2013.01)

(58) Field of Classification Search
CPC ...... G06T 11/00; G02B 27/0172; G06F 3/012
USPC .......................................................... 345/633
See application file for complete search history.

(56) References Cited

U.S. PATENT DOCUMENTS

| | | | |
|---|---|---|---|
| 11,184,517 B1 * | 11/2021 | Cui ........................ | H04N 7/181 |
| 2014/0002444 A1 | 1/2014 | Bennett et al. | |
| 2014/0043433 A1 * | 2/2014 | Scavezze ........... | G02B 27/0172 |
| | | | 348/42 |

OTHER PUBLICATIONS

Future Lab, "Augmented reality in physical security", May 19, 2017, printed from https://futurelab.assaabloy.com/en/augmented-reality-in-physical-security/, 4 pages.

(Continued)

*Primary Examiner* — Thomas J Lett

(57) ABSTRACT

A processing system including at least one processor may detect a location and an orientation of an augmented reality endpoint device of a user at a venue, identify a permission zone of the venue within a field of view of the augmented reality endpoint device in accordance with the location and the orientation of the augmented reality endpoint device, determine at least one condition for the user to access the permission zone, and present, via the augmented reality endpoint device, first visual information associated with the at least one condition for the user to access the permission zone, where the first visual information associated with the at least one condition is presented within the field of view and comprises at least one feature indicative of an association with the permission zone.

20 Claims, 5 Drawing Sheets

(56) References Cited

OTHER PUBLICATIONS

Gizmodo, "Google and Telstra Want You to Use Augmented Reality at Marvel Stadium, You Nerds", printed from Google and Telstra Want You to Use Augmented Reality at Marvel Stadium, You Nerds (gizmodo.com.au), last published May 12, 2022, 6 pages.
Immersiv.io, "Examples of Augmented Reality (AR) Experiences in Sports", printed from Immersiv.io—Examples of Augmented Reality (AR) Experiences in Sports, Oct. 16, 2020, 16 pages.

* cited by examiner

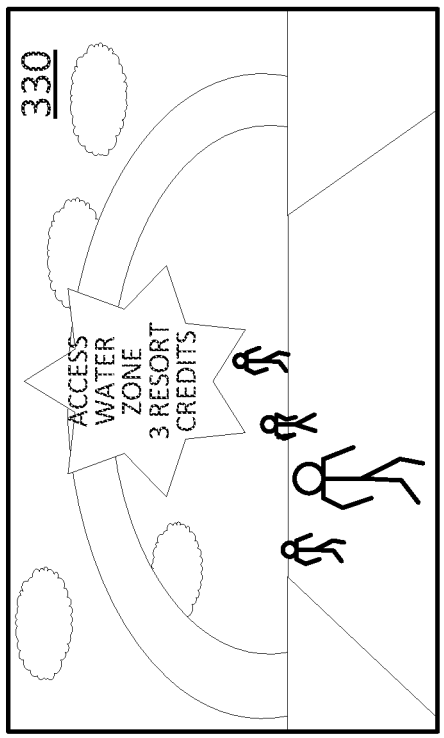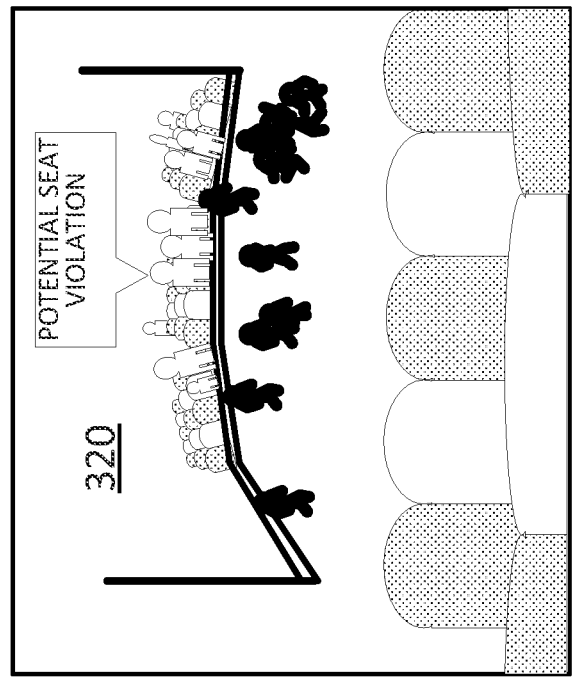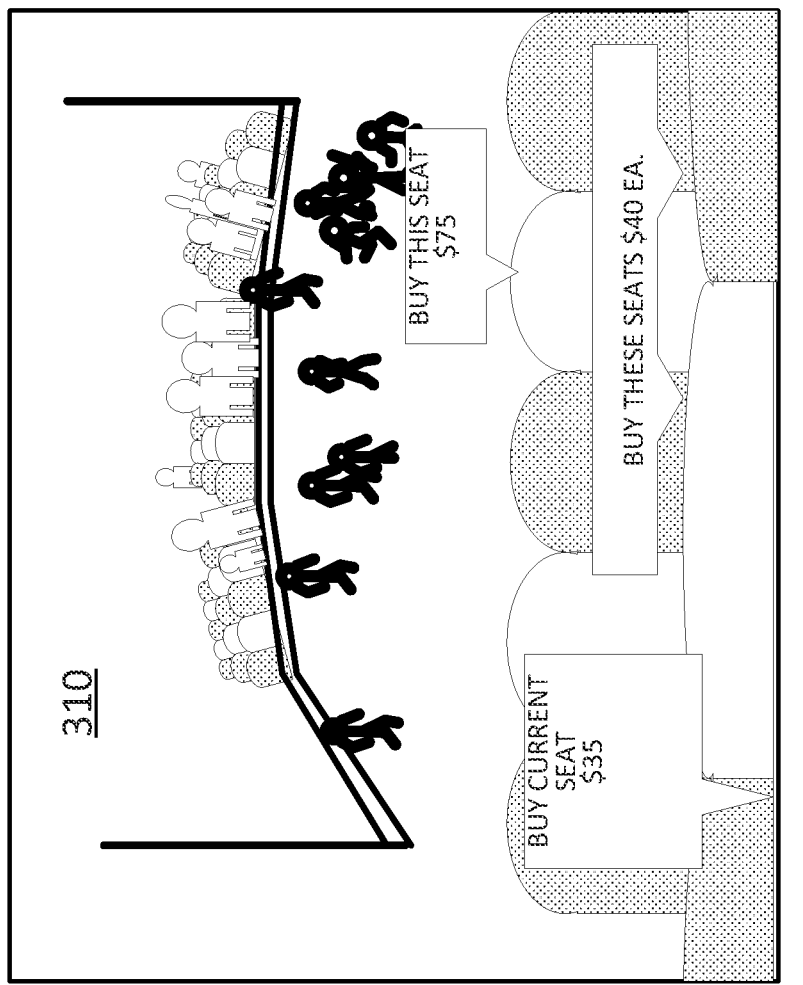
FIG. 3

AUGMENTED REALITY PERMISSION ZONES

The present disclosure relates generally to augmented reality devices and systems, and more particularly to methods, computer-readable media, and apparatuses for presenting via an augmented reality endpoint device first visual information associated with at least one condition to access a permission zone.

BACKGROUND

The use of augmented reality (AR) and/or mixed reality (MR) applications is increasing. In one example, an AR endpoint device may comprise smart glasses with AR enhancement capabilities. For example, the glasses may have a screen and a reflector to project outlining, highlighting, or other visual markers to the eye(s) of a user to be perceived in conjunction with the surroundings. The glasses may also comprise an outward facing camera to capture video of the physical environment from a field of view in a direction that the user is looking.

SUMMARY

In one example, the present disclosure describes a method, computer-readable medium, and apparatus for presenting via an augmented reality endpoint device first visual information associated with at least one condition to access a permission zone. For instance, in one example, a processing system including at least one processor may detect a location and an orientation of an augmented reality endpoint device of a user at a venue, identify a permission zone of the venue within a field of view of the augmented reality endpoint device in accordance with the location and the orientation of the augmented reality endpoint device, determine at least one condition for the user to access the permission zone, and present, via the augmented reality endpoint device, first visual information associated with the at least one condition for the user to access the permission zone, where the first visual information associated with the at least one condition is presented within the field of view and comprises at least one feature indicative of an association with the permission zone

BRIEF DESCRIPTION OF THE DRAWINGS

The teaching of the present disclosure can be readily understood by considering the following detailed description in conjunction with the accompanying drawings, in which:

FIG. 3 illustrates additional examples of augmented reality views of a venue, in accordance with the present disclosure;

To facilitate understanding, identical reference numerals have been used, where possible, to designate identical elements that are common to the figures.

DETAILED DESCRIPTION

Figure 1:
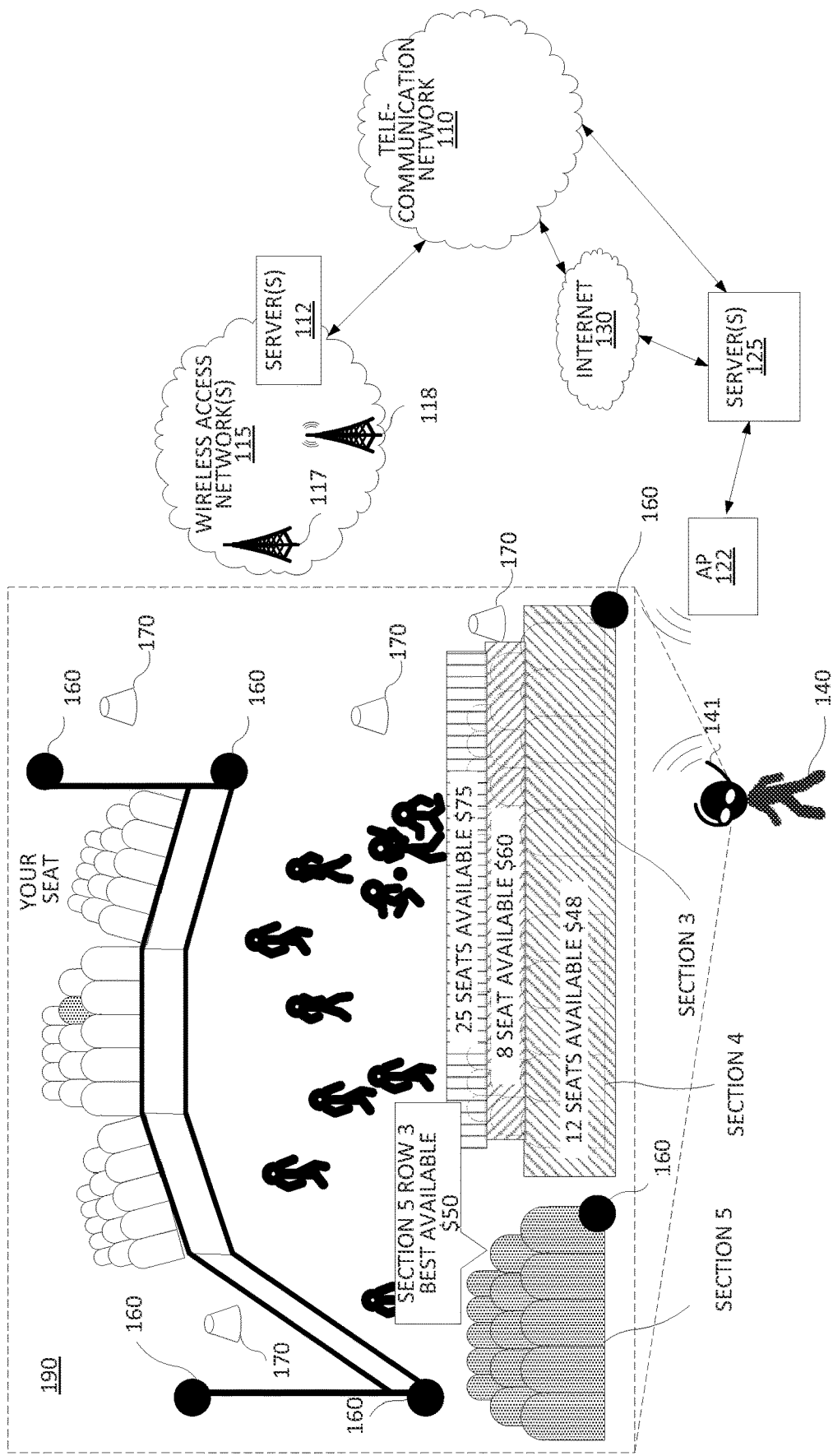
FIG. 1 illustrates an example system related to the present disclosure.

Examples of the present disclosure describe methods, computer-readable media, and apparatuses for presenting via an augmented reality endpoint device first visual information associated with at least one condition to access a permission zone. Usage of augmented reality (AR) and/or mixed reality (MR) applications is ever increasing. In one example, an AR endpoint device may comprise smart eyewear, e.g., smart glasses or smart goggles, with AR enhancement capabilities. For example, the glasses may have a screen and a reflector to project outlining, highlighting, or other visual markers to the eye(s) of a user to be perceived in conjunction with the surroundings. The glasses may also comprise an outward facing camera to capture video of the physical environment from a field of view in a direction that the user is looking, which may be used in connection with detecting various objects or other items that may be of interest in the physical environment, determining when and where to place AR content within the field of view, and so on. In addition, an AR endpoint device may be equipped with a Global Positioning System (GPS) unit, a gyroscope, a compass, an altimeter, one or more accelerometers, and so forth in order to determine a position/location and orientation information, which may be further used in determining when and where to place AR content within the field of view.

Examples of the present disclosure enable an AR-based experience for a user to access permission zones within a venue. For example, the present disclosure may relate to AR experiences in event venues such as stadiums, arenas, and theme parks, but may apply to other situations as well, such as hotels, clubs, theaters, concert halls, cruise ships, casinos, and so forth. In one example, a user is more readily able to see permission zones, e.g., areas at a venue that the user is permitted (or not permitted) to access, and may also obtain access or upgrade(s) of access. At the same time, compliance within the permitted area(s)/permission zone(s) may also be monitored, and in one example, may be visualized via one or more AR devices of venue personnel.

It should be noted that in accordance with the present disclosure, a smallest instance of a "permission zone" may comprise a seat, or a location intended for one person (e.g., a standing room location, a location to place a chair, etc.). Other examples of a permission zone may include a box (e.g., a box of seats), a row of seats and/or bench, a section of seats or other sub-measures (e.g., a section comprised of multiple standing room locations, a mixture of standing room locations and seats, and so forth). In accordance with the present disclosure, a permission zone may also include an area of a theme park (e.g., a portion of the theme park comprising less than all of the park), a particular ride or other attractions, and so forth. Similarly, a permission zone may include a portion of a hotel, club, casino, stadium, theater, cruise ship, or the like, such as a particular pool to which access is restricted to less than all of the hotel guests, a reserved cabana area, a special gaming area of a casino that is not open to all guests, and so forth.

In an illustrative example, a user may be equipped with a mobile computing device, such as a smartphone. In one example, the mobile computing device may be equipped with a venue application (app) that may utilize AR capabilities of the mobile computing device in conjunction with venue map information and other data particular to the venue. For instance, if the venue is a stadium, such an app may have access to a map of the physical layout of the stadium, which may include location information and/or visual information of each seat. In one example, the user may be equipped with a wearable AR viewer, such as AR glasses, AR goggles, AR face shields, AR headset, etc., which may be connected to the mobile computing device and the venue app, for instance via a near-field connection (NFC) wireless link, or the like. The AR viewer may include an audio headset component, or the user may be equipped with wired or wireless headphones/headset (e.g., including earbuds, on-ear headphones, etc.), which may also be in communication with the smart device (e.g., via the wired connection and/or via NFC wireless link, or the like). The mobile computing device may be in communication with the AR server via one or more networks, and may utilize a cellular or non-cellular wireless access. For instance, the venue application may include a server-side process operating on an AR server that may also be in communication with an AR content database and a ticketing database. In another example, the AR viewer may comprise a stand-alone mobile computing device. In other words, the AR viewer may have independent wireless communication capabilities to connect to a network access point, such as a cellular base station, a non-cellular wireless access point, or the like. In addition, the AR viewer may include its own independent user interface, and may include the venue app operating thereon.

In a venue such as a stadium, the user may arrive with a reserved seat or may arrive and, upon entering the venue, may pay a base level admission fee. The user may use the venue app to invoke an AR viewer. If the user has a reserved seat, the AR viewer may present a visual indication of the user's seat (e.g., a visual enhancement rendered via an AR display and that is not part of the natural visual environment of the venue). For instance, in one example, the mobile computing device may communicate the location of the mobile computing device and orientation of the AR viewer (which may be one and the same with the mobile computing device, or which may be paired with or otherwise in communication with the mobile computing device). In one example, the mobile computing device may also transmit a user identification (ID), a ticket ID, or both, via the venue app to the AR server. The AR server may identify the seat location with respect to the location and orientation of the AR viewer and may provide AR content for presentation to the user via the AR viewer, e.g., highlighting of the user's seat, one or more arrows providing directions to the user's seat, pointing towards the user's seat, or the like. Alternatively, or in addition, the AR server may query the ticketing database for one or more best available seats, and may send AR content for display via the AR viewer, e.g., to indicate one or more criteria for accessing the available seat(s), such as an offer to allow the user to purchase/reserve the seat(s) for a fee (e.g., a new fee or an upcharge), and/or a non-monetary access criterion, such as agreeing to a minimum food and drink purchase, agreeing to share live video recorded via the AR viewer from the seat location during the event, agreeing to give up a previously purchased and/or reserved seat (for example, another party may wish to include an additional person, and would be willing to take the user's current seat if the user were willing to vacate it), and so forth.

The user may reserve one or more of the available seats in various ways, such as speaking a command (e.g., "upgrade to best available"), which may be captured via a microphone of the mobile computing device and/or AR viewer and transmitted by the mobile computing device to the AR server via the venue app to update the user's seat information and the user's ticket information in the ticketing database. Similarly, the user may enter an input via a touchscreen, a keyboard, or the like of the mobile computing device (e.g., via a graphical user interface (GUI), where the mobile computing device is distinct from the AR viewer, such as a mobile smartphone).

In one example, the user may not wish to commit to changing seats without first going to an offered available seat and seeing the view. In this case, the user may issue a command, such as "save the seat" or "save section 145 row 11 seat 8," in which case the seat may be saved for the user for a period of time. In one example, the AR viewer may display AR content in the form of a countdown timer to track the time remaining. The user may similarly issue a voice command such as "upgrade now" to purchase the seat, trade seats, or otherwise commit to the new seat before the timer expiration. In addition, in one example, if the user arrives without a specific seat assigned, the user may be presented with AR content generated by the AR server that shows sections or other zones of seats that are available (e.g., color coded highlighting or shading indicating different price zones, zones with more or less seats available, etc., overlay text indicating price ranges for sections or other zones (e.g., "$25-48"), etc.). In one example, areas in the venue may further be designated with categories, and saved in the ticketing database. For example, areas may be designated as being preferred for specific types of patrons (e.g., stand and cheer section(s), away team fan section(s), families with children section(s), etc.). In this case, additional AR content may be provided by the AR server and presented via the user's AR viewer indicating these area/section designations (e.g., where the AR content may similarly comprise color coded indicators, overlay text rendered on/over the associated section(s) or other zone(s), etc.).

In one example, the AR content rendered by the AR display may include specific seats that are available with seat sections or other zones, responsive to the user approaching or entering a section or other zones of the venue. For example, the user may walk to a section of seats that the user is interested in, and as an alternative or in addition to AR content comprising one or more visual indicators pertaining to the section, individual seat prices of one or more seats may then be caused to appear in the user's view, e.g., for seats within a certain distance of the user. Upon arrival at a particular seat, the user may respond to a prompt via venue app, such as a button to "Buy this Seat" or a similar input via a voice command. For instance, the AR viewer or mobile computing device may provide user location information to the AR server, which may cross-reference seat locations in the seating database. As such, the AR server may determine which seat the user has selected, and may also record the user's selection in the ticketing database.

In one example, demand for access to parts of the venue may vary. For instance, weather may change during an event, how close the score of a game is, or how much time remains in the game may facilitate opportunities for seat changes. For example, various patrons of a venue may be tracked via their respective mobile computing devices such that if a patron in a particular seat leaves the venue, then such seat may be made available to other patrons/users for the remainder of the event. Thus, vacated seats and similarly seats that were not previously reserved may be offered under these changing conditions, and users may access these opportunities via their AR viewers and venue apps in communication with the AR server.

Although the foregoing is described primarily in connection with seats at a stadium, examples of the present disclosure may similarly apply to other venues where the level of service offered to the user may vary based on the user's location within the venue—for instance, a theme park, a museum, a botanical garden, a concert, a festival, or other event venues. In this case, the ticketing database may include a record for each user that defines specific zones in which the user is allowed to be located under a current admission level. In one example, the permission zones may be represented as a range of geographic coordinates in the ticketing database for the user, but may be represented in other ways, such as via zone names, zone labels or ID, etc. In one example, the AR server may provide AR content for display on a user's AR viewer, wherein permission zones (or just borders of their permission zones) may be represented as a demarcation, such as green for permitted areas. Areas beyond the current authorized permission zone(s) may be represented in an alternate color, or colors, or via other visual indicators (such as overlay text of "not included in your ticket," "prohibited areas," "private party areas," or the like). In one example, the user may also be alerted via audio content from the AR server to be presented via the user's earphones as a boundary of a permission zone is approached. In one example, the AR server may determine or may retrieve conditions for the user to gain access to one or more additional permission zones, in which case the AR content provided by the AR server for display on the user's AR viewer may include indicators of such condition(s), such as a cost to access a new permission zone presented as overlay text, a color-coded indicator of the cost, etc., and similarly for non-monetary conditions, such as agreeing to relinquish an access to another permission zone or other features associated with the user's visit to the venue, and so forth. The user may agree to the conditions to access a new permission zone by simply entering the new area/permission zone, may speak a command, may provide a tactile input, and so forth as described above.

In one example, the ticketing database for a stadium, theme park, or other venues may contain a list or range of permitted location coordinates for each user based on the user's ticket level, specific seat purchase, or the like. In one example, users may opt-in to mobile computing device location sharing in connection with the use of the venue app. Thus, the users' locations may be tracked in relation to the authorized permission zone(s). Users who are outside of their permission zone(s) may be alerted by audio presentation via the venue app, via text message, or similar communication. In addition, an alert may be sent to a monitoring system, which may present locations of out-of-area users a map of the venue. In one example, permission zone compliance may also be aided by video analysis. For instance, a venue staff member may be equipped with an AR viewer, e.g., including an outward facing camera. The staff member may view an area of the venue, such as a seating section, which may be recorded as video via the camera. The video image(s) may be analyzed either at the AR viewer, an associated mobile computing device of the staff member, or at the AR server to detect vacant and occupied seats. If a seat is determined to be occupied via visual analysis, then the ticketing database may be accessed to determine if a ticket was sold for the seat. If so, and if the user is sharing the location of the user's mobile computing device and it matches with the location of the seat, then no violation is recorded. However, if the user is not at his or her seat, but the seat is occupied, then a potential permission zone violation is detected. In such case, the AR server may send AR content to cause the staff member's AR display to present a visual indicator of the seat where a potential violation is detected (e.g., again via highlighting, one or more arrows pointing toward the seat, overlay text of the section, row, and seat number, etc.). Similarly, if the seat was not sold but it is detected to be occupied, then a potential violation may likewise be declared and alerted to the staff member via the AR content. Seat occupation may also be determined via weight sensors or other sensors if the venue's seats are so equipped. These and other aspects of the present disclosure are discussed in greater detail below in connection with the examples of FIGS. 1-5.

To aid in understanding the present disclosure, FIG. 1 illustrates an example system 100, related to the present disclosure. As shown in FIG. 1, the system 100 connects mobile computing device 141, server(s) 112, server(s) 125, wireless beacons/sensors 170, and so forth with one another and with various other devices via a core network, e.g., a telecommunication network 110, a wireless access network 115 (e.g., a cellular network), and Internet 130. It should be noted that although the system 100 may support numerous user devices/mobile computing devices, for illustrative purposes only mobile computing device 141 is shown in FIG. 1.

Figure 4:
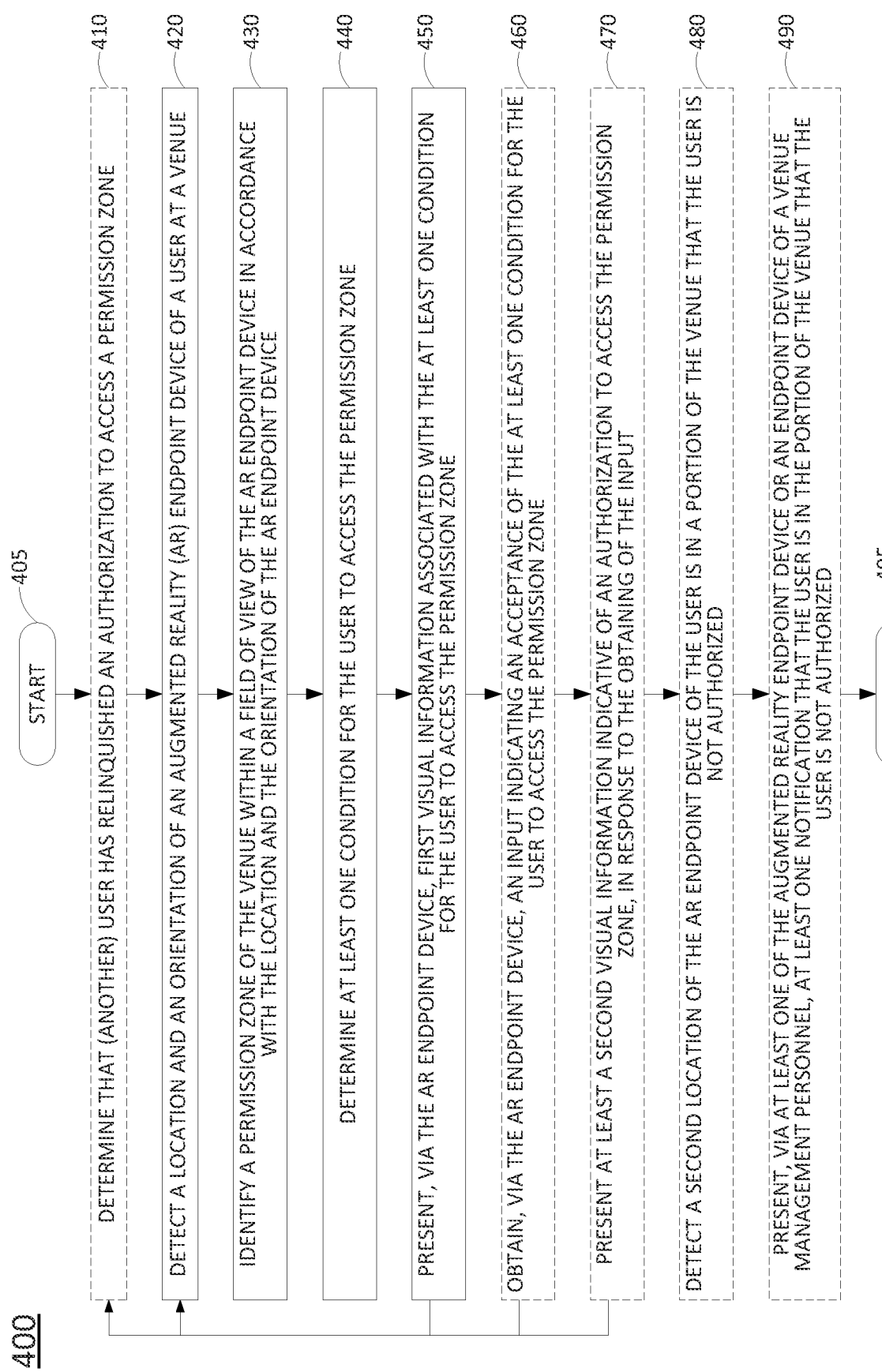
FIG. 4 illustrates a flowchart of an example method for presenting via an augmented reality endpoint device first visual information associated with at least one condition to access a permission zone.
Figure 5:
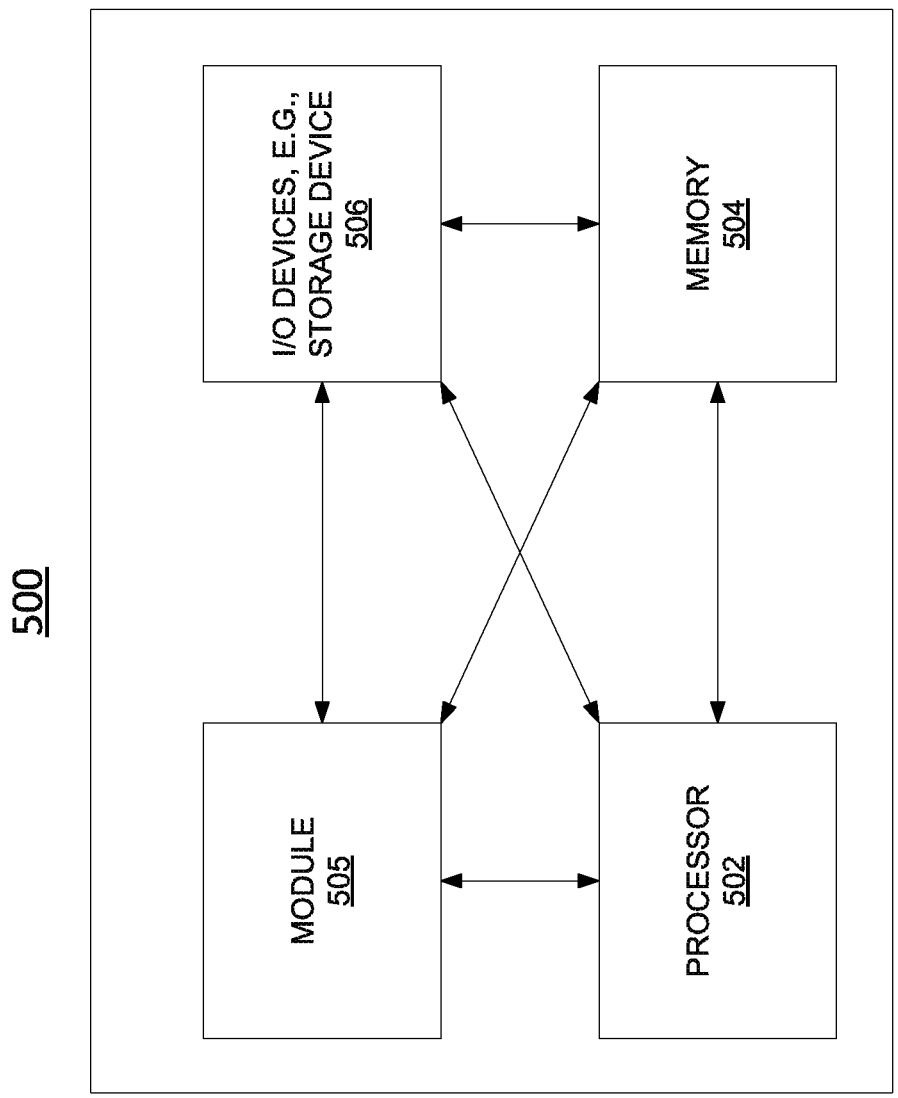
FIG. 5 illustrates an example high-level block diagram of a computing device specifically programmed to perform the steps, functions, blocks, and/or operations described herein.

In one example, the server(s) 125 may each comprise a computing device or processing system, such as computing system 500 depicted in FIG. 5, and may be configured to perform one or more steps, functions, or operations for presenting via an augmented reality endpoint device first visual information associated with at least one condition to access a permission zone, such as illustrated in FIG. 4 and described below. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 5 and discussed below) or multiple computing devices collectively configured to perform various steps, functions, and/or operations in accordance with the present disclosure.

In one example, server(s) 125 may comprise a venue management system, which in one example may include a seating database and/or a reservation and ticketing system. For instance, server(s) 125 may receive and store information for each seat such as a seat location (e.g., in two or three dimensional coordinates, and/or by section, row, and seat number), a field indicating whether the seat is reserved or not (e.g., for a particular date, time, and or event), an identifier of a user/patron who has reserved the seat, or a link to a user/patron record in the ticketing and reservation database, a field indicating any other seats associated with reservation(s) of other users/patrons in a same group, a field indicating whether the seat is currently occupied, an identifier of a user and/or a device of a user detected to be in the seat (if any), a cost or other condition(s) for reserving or otherwise occupying the seat, and so on.

The reservation and ticketing system may include user/patron records that contain users' names, usernames to login to a venue app, mobile device identifiers (such as a phone number, IMSI, IMEI, or the like of mobile computing device 141 for user 140), any seat/ticket reservations for current or upcoming dates, times, and/or events at the venue 190, current charges or balances, any current seat offers or temporarily held seats for users at the venue 190 (e.g., for in-person seat upgrades or unreserved seat selection), and so on.

In one example, server(s) 125 may store location data of wireless beacons/sensors 170 of venue 190, such as Institute of Electrical and Electronics Engineers (IEEE) 802.15 based-beacons. Alternatively, or in addition, server(s) 125 may store an AR anchor map, e.g., a database of locations of AR anchors/reference points 160 for the venue 190, e.g., each having a position with a fixed spatial relationship to visual features of the venue 190, such as support columns, gaps between sections, walls, foul ball poles (e.g., where the venue 190 may comprise a baseball stadium, and similarly with respect to distinctive visual features for other sporting and non-sporting venues), and so forth. In one example, each AR anchor/reference point may include keypoint descriptors which enable detection of the same AR anchor/reference point in multiple images and from varying perspectives.

The keypoint descriptors for AR anchors 160 may be specific to particular types of visual/image and/or spatial sensor data, or may be associated with multiple types of sensor data as inputs. For instance, with respect to images or video, the input sensor data may include low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like. For instance, these features could be used to help quantify and distinguish plastic seats from a concrete floor, metal railings, etc. Other features may be based upon light detection and ranging (LiDAR) input data, infrared camera input data, and so on.

In one example, server(s) 125 may provide the AR anchor map, or portions thereof, to user devices, such as mobile computing device 141, in order to detect relevant visual features in the venue 190. For instance, mobile computing device 141 may perform simultaneous localization and mapping (SLAM) using the AR anchor map and images and/or video captured from an outward facing camera of mobile computing device 141. In one example, the SLAM process may also incorporate and use location and/or orientation data of mobile computing device 141. For instance, using an integral global positioning system (GPS) unit, gyroscope, and compass, mobile computing device 141 may track its position and orientation within the 3D environment of venue 190. Alternatively, or in addition, mobile computing device 141 may determine its position/location via triangulation or via similar calculation with respect to wireless beacons/sensors 170.

In one example, the system 100 includes a telecommunication network 110. In one example, telecommunication network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication network 110 uses a network function virtualization infrastructure (NFVI), e.g., host devices or servers that are available as host devices to host virtual machines comprising virtual network functions (VNFs). In other words, at least a portion of the telecommunication network 110 may incorporate software-defined network (SDN) components.

In one example, one or more wireless access networks 115 may each comprise a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network(s) 115 may each comprise an access network in accordance with any "second generation" (2G), "third generation" (3G), "fourth generation" (4G), Long Term Evolution (LTE), "fifth generation" (5G), or any other existing or yet to be developed future wireless/cellular network technology. While the present disclosure is not limited to any particular type of wireless access network, in the illustrative example, base stations 117 and 118 may each comprise a Node B, evolved Node B (eNodeB), or gNodeB (gNB), or any combination thereof providing a multi-generational/multi-technology-capable base station. In the present example, mobile computing device 141 may be in communication with base stations 117 and 118, which provide connectivity between mobile computing device 141 and other endpoint devices within the system 100, various network-based devices, such as server(s) 112, server(s) 125, and so forth. In one example, wireless access network(s) 115 may be operated by the same service provider that is operating telecommunication network 110, or one or more other service providers.

For instance, as shown in FIG. 1, wireless access network(s) 115 may also include one or more servers 112, e.g., edge servers at or near the network edge. In one example, each of the server(s) 112 may comprise a computing device or processing system, such as computing system 500 depicted in FIG. 5 and may be configured to provide one or more functions in support of examples of the present disclosure for presenting via an augmented reality endpoint device first visual information associated with at least one condition to access a permission zone. For example, one or more of the server(s) 112 may be configured to perform one or more steps, functions, or operations in connection with the example method 400 described below. For instance, telecommunication network 110 may provide a venue management system, e.g., as a service to one or more subscribers/customers, in addition to telephony services, data communication services, television services, etc. In one example, server(s) 112 may operate in conjunction with server(s) 125. For instance, server(s) 112 may manage AR mapping data while server(s) 125 may primarily manage a seating database, a reservation and ticketing system, etc., e.g., operated by the venue 190. It is noted that this is just one example of a possible distributed architecture for a venue management system and/or a network-based venue management support service. Thus, various other configurations including various data centers, public and/or private cloud servers, and so forth may be deployed. For ease of illustration, various additional elements of wireless access network(s) 115 are omitted from FIG. 1.

As illustrated in FIG. 1, mobile computing device 141 may comprise an AR endpoint device, for example, a cellular telephone, a smartphone, a tablet computing device, a laptop computer, a head-mounted computing device (e.g., smart glasses), a wireless enabled wristwatch, or any other wireless and/or cellular-capable mobile telephony and computing device (broadly, a "mobile device" or "mobile endpoint device"). In one example, mobile computing device 141 may be equipped for cellular and non-cellular wireless communication, such as 4G/Long Term Evolution-based cellular communication, 5G cellular communications, Institute of Electrical and Electronics Engineers (IEEE) 802.11 based communications (e.g., Wi-Fi, Wi-Fi Direct), IEEE 802.15 based communications (e.g., Bluetooth, Bluetooth Low Energy (BLE), and/or ZigBee communications), and so forth. In accordance with the present disclosure, mobile computing device may include an outward facing camera, a microphone, at least one speaker (e.g., at least one earpiece), a light detection and ranging (LiDAR) unit, a global positioning system (GPS) unit, an altimeter, a gyroscope, a compass, and so forth. In one example, mobile computing device 141 may comprise smart eyewear, e.g., a pair of smart glasses, with augmented reality (AR) enhancement capabilities. For example, mobile computing device 141 may have a screen and a reflector to project outlining, highlighting, or other visual markers to the eye(s) of user 140 to be perceived in conjunction with the surroundings.

In addition, mobile computing device 141 may include an on-board processing system to perform steps, functions, and/or operations in connection with examples of the present disclosure for presenting via an augmented reality endpoint device first visual information associated with at least one condition to access a permission zone. For instance, mobile computing device 141 may comprise all or a portion of a computing device or processing system, such as computing system 500 as described in connection with FIG. 5 below, specifically configured to perform various steps, functions, and/or operations as described herein. It should be noted that in another example, user 140 may be equipped with a non-standalone AR device (e.g., smart glasses) that are paired with a smartphone or similar mobile computing device. However, for illustrative purposes FIG. 1 shows an example where mobile computing device 141 is independently capable of presenting a user interface, operating a client-side portion of a venue app, communicating with remote servers, such as server 125, and so forth.

In an illustrative example, user 140 having mobile computing device 141 may approach venue 190. The mobile computing device 141 may be in communication with server(s) 125, e.g., over a cellular connection via one of base stations 117 or 118, telecommunication network 110, Internet 130, etc., via a non-cellular wireless connection with AP 122, e.g., where AP 122 and server(s) 125 may be part of a same local area network (LAN) or intranet of an operator of venue 190, or the like. In one example, mobile computing device 141 may communicate with server(s) 125 in accordance with a venue app installed and in operation on mobile computing device 141. Mobile computing device 141 may capture images/video of the environment of venue 190, which mobile computing device 141 may use to perform a SLAM process as noted above. For instance, server(s) 125 may provide a venue map to mobile computing device 141 that includes information regarding AR anchors/reference points 160, including keypoint descriptors, e.g., a signature for respective anchor points, which may be used by mobile computing device 141 to determine its location and orientation, and any of AR anchors 160 within view. In one example, mobile computing device 141 may further use location and/or orientation information, LiDAR, or similar data that may be available depending upon the capabilities of mobile computing device 141 and/or the extent to which such additional data may comprise part of the signatures for the AR anchors 160.

In one example, server(s) 125 may also provide AR content for rendering/display via mobile computing device 141 in association with various visual features that may be within the field-of-view as determined in accordance with detected ones of the AR anchors 160. In one example, some or all of the AR content may be provided in advance (e.g., before detecting specific AR anchor(s)). Alternatively, mobile computing device 141 may communicate detected anchor points and/or their location and orientation information to server(s) 125, in response to which server(s) 125 may provide any corresponding AR content for display within the current field-of-view, or an anticipated field-of-view based upon one or more recent viewports (e.g., determining a trajectory of the viewport or field-of-view based upon the viewport/field-of-view over one or more prior points in time).

For instance, as illustrated in FIG. 1, a seat reserved by user 140 may be in view, the location of which may be detected in relation to one or more of the AR anchors 160. In this case, server(s) 125 may provide AR content comprising visual information relating to the seat for rendering/display via mobile computing device 141. In one example, there may be an arrow and text box projected within the view of user 140 with the text "your seat" and the arrow pointing toward the seat. The AR content may include location and/or orientation data to enable mobile computing device 141 to project the visual information in the correct spatial location with respect to the seat (e.g., in accordance with location and spatial orientation information with respect to one or more of the AR anchors 160).

Similarly, as also illustrated in FIG. 1, an entire section of seats (e.g., Section 5) may be in view of the user 140 via mobile computing device 141, the location of which may be detected in relation to one or more of the AR anchors 160. In this case, server(s) 125 may provide AR content comprising visual information relating to Section 5 for rendering/display via mobile computing device 141. For instance, there may be a text box projected within the view of user 140 with the text "Section 5 Row 3, best available $50." In addition, the entire section of seats may be shaded, highlighted, or the like to draw attention to this section and to help delineate its boundaries. The AR content may include location and/or orientation data to enable mobile computing device 141 to project the visual information in the correct spatial location with respect to Section 5 (e.g., in accordance with location and spatial orientation information with respect to one or more of the AR anchors 160). In one example, this particular AR content may be personalized to the user 140 by server(s) 125. For instance, user 140 may be a frequent visitor to the venue 190 and may be presented with a different offer for the seat than for other users.

It should be noted that as shown in FIG. 1, a specific seat being offered is not actually identified in the AR content, nor is the specific row (e.g., Row 3), being highlighted. Rather, the AR content comprises highlighting, shading, or the like, for the entire Section 5. For instance, the user 140 may still be somewhat far away from Section 5 such that a specific seat would not be visibly discernable in a useful way. However, in one example, more specific AR content may be provided for display via mobile computing device 141 as the user 140 moves closer to Section 5 or actually enters part of Section 5 (such as in accordance with the example AR view 310 of FIG. 3). In one example, the mobile computing device 141 may be configured to receive certain commands from user 140 in connection with accepting or declining an offer included in the AR content that is presented. For instance, mobile computing device 141 may capture audio input data and perform a speech recognition process to determine if a voice command/voice input is received that expresses an acceptance of the offer. In one example, the mobile computing device 141 may further perform a natural language processing and/or an intent determination process to determine if the user is accepting the offer. In another example, audio data may be captured and then uploaded to server(s) 125, which may then perform the same or similar operations to determine if user 140 has accepted or declined an offer. In other words, mobile computing device 141 may be relieved of performing such operations, which are instead performed server-side.

In one example, mobile computing device 141 may project a graphical user interface (GUI) within the field of view of the user (not shown), and the user may interact with the GUI via gestures to select or decline an offer. Similarly, in an example in which the mobile computing device 141 may be paired with a smartphone or the like, user 140 may enter an input via a GUI on the smartphone or similar device to accept or decline an offer. In one example, server(s) 125 may update a seating database, a ticketing database, and/or an AR content database in response to any input/selection of user 140. For instance, the AR content may be changed to include a text box of "your seat" and an arrow pointing to a new seat for user 140 in Section 5 Row 3 and provided to mobile computing device 141. In addition, mobile computing device 141 may be instructed to remove the previous text box and arrow pointing to the old seat from a set of displayable AR content in the possession of mobile computing device 141.

As further illustrated in FIG. 1, an area of venue 190 comprising several sections of seats (e.g., Section 3 and Section 4) may be within the view of user 140 via mobile computing device 141. For instance, this may be simultaneous with or at a different time from when Section 5 may be visible the user 140. In any case, the location of these sections may be detected in relation to one or more of the AR anchors 160. In response, server(s) 125 may provide AR content comprising visual information relating to Sections 3 and 4 for rendering/display via mobile computing device 141. For example, there may be distinctive colors and/or shading highlighting different price tiers of seats within Sections 3 and 4. In addition, the AR content may include the number of seats available and the prices for the seats in the different price tiers. Similar to the previous examples, the AR content may include location and/or orientation data to enable mobile computing device 141 to project the visual information in the correct spatial location with respect to Sections 3 and 4 (e.g., in accordance with location and spatial orientation information with respect to one or more of the AR anchors 160). In one example, this particular AR content may also be personalized to the user 140 by server(s) 125, e.g., where different offers may be presented to different users for the same seats.

The user 140 may choose to upgrade to (or select a seat in the first instance) from one of these price tiers within sections 3 or 4. For instance, the user may speak the command "upgrade to best available in seventy five dollar tier" or the like. Alternatively, or in addition, the user 140 may request additional information, such as by speaking the command "list available seats in seventy five dollar tier" in response to which server(s) 125 may provide an audio response listing the seats, e.g., "Section 3 Row 1 Seat 10, Section 3 Row 1 Seat 9, Section 3 Row 2 Seat 4, Section 4 Row 1 Seat 11, . . . ". In response, the user may make a selection of a particular seat. In one example, server(s) 125 may update a seating database, a ticketing database, and/or an AR content database in response to any input/selection of user 140. In addition, the user input(s) may take any of the forms such as noted above, or others.

Alternatively, or in addition, user 140 may move closer to or within Section 3 and/or Section 4, in response to which more detailed AR content may be made available by server(s) 125 and/or mobile computing device 141 for display to user 140. For instance, specific seats may be identified with arrows and text boxes, highlighting, shading, etc. indicating availability and/or offers for selection for user 140 (such as in accordance with the example AR view 310 of FIG. 3).

Figure 2:
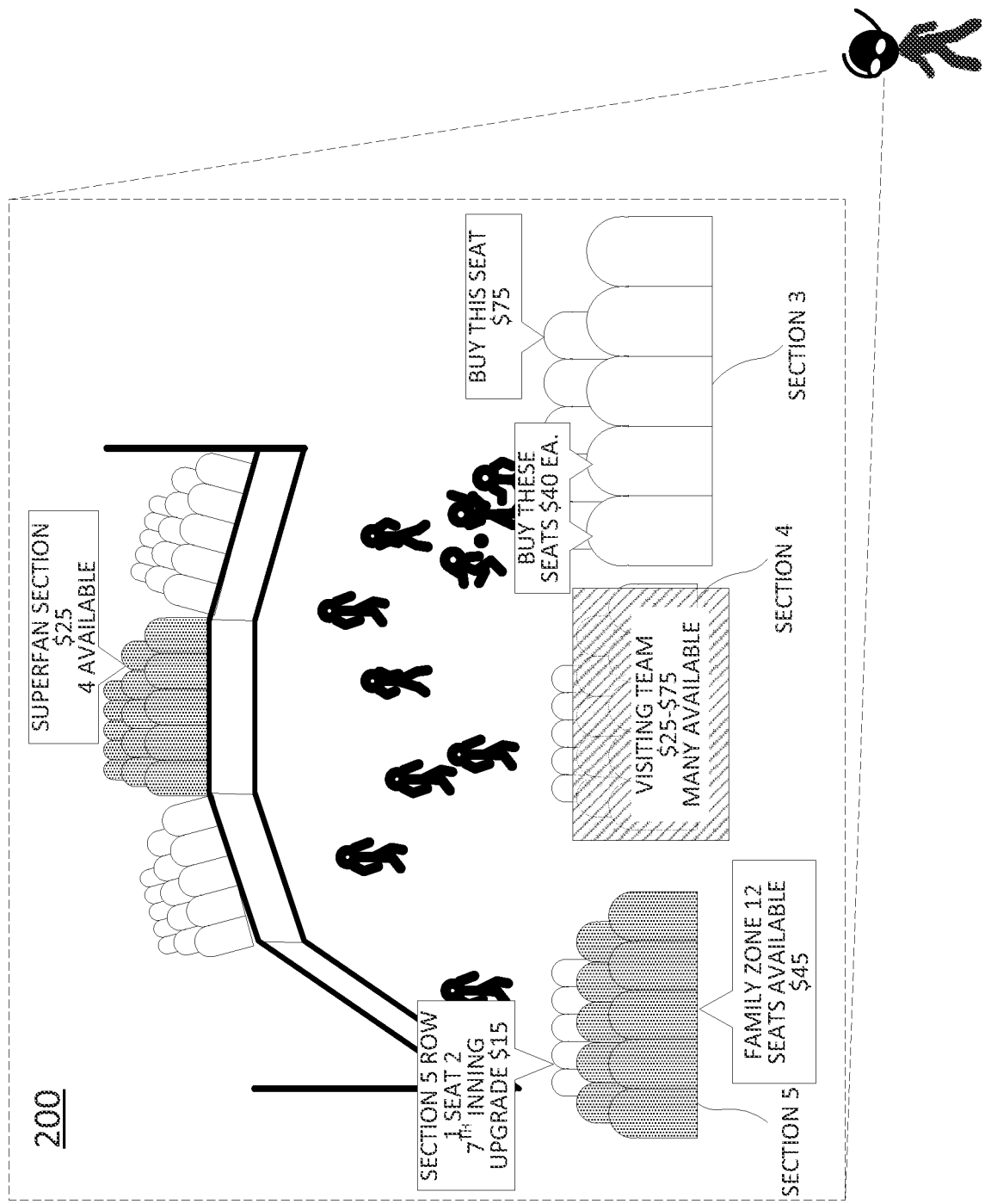
FIG. 2 illustrates examples of an augmented reality view of a venue, in accordance with the present disclosure.

The foregoing illustrates just several examples of a user's AR experience for management of venue permission zones (e.g., seating), including seating selection, upgrading, and so forth. Additional examples in accordance with the present disclosure are illustrated in FIGS. 2 and 3, and described in greater detail below. Furthermore, the foregoing illustrates just one example of a system in which examples of the present disclosure for presenting via an augmented reality endpoint device first visual information associated with at least one condition to access a permission zone may operate. In addition, although the foregoing example is described and illustrated in connection with a single mobile computing device 141, a single user 140, etc., it should be noted that various other scenarios may be supported in accordance with the present disclosure.

It should also be noted that the system 100 has been simplified. In other words, the system 100 may be implemented in a different form than that illustrated in FIG. 1. For example, the system 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

As just one example, one or more operations described above with respect to server(s) 125 may alternatively or additionally be performed by server(s) 112, and vice versa. In addition, although server(s) 112 and 125 are illustrated in the example of FIG. 1, in other, further, and different examples, the same or similar functions may be distributed among multiple other devices and/or systems within the telecommunication network 110, wireless access network(s) 115, and/or the system 100 in general that may collectively provide various services in connection with examples of the present disclosure for presenting via an augmented reality endpoint device first visual information associated with at least one condition to access a permission zone. In still another example, severs(s) 112 may reside in telecommunication network 110, e.g., at or near an ingress node coupling wireless access network(s) 115 to telecommunication network 110, in a data center of telecommunication network 110, or distributed at a plurality of data centers of telecommunication network 110, etc. Additionally, devices that are illustrated and/or described as using one form of communication (such as a cellular or non-cellular wireless communications, wired communications, etc.) may alternatively or additionally utilize one or more other forms of communication. For instance, in one example, server(s) 125 may communicate with mobile computing device 141, wireless beacons/sensors 170, seats of the venue 190, and other devices at venue 190 via a wireless access point (AP) 122. For instance, server(s) 125 may be owned or operated by the same entity owning or controlling the venue 190, and may have one or more wireless access points, such as AP 122, deployed throughout the venue 190. Thus, communications between server(s) 125 and mobile computing device 141 may not need to traverse any networks external to the entity. For instance, AP 122 and mobile computing device 141 may establish a session via Wi-Fi Direct, LTE Direct, a 5G D2D sidelink, a DSRC session/pairing, etc. Thus, these and other modifications are all contemplated within the scope of the present disclosure.

FIG. 2 illustrates an example AR view 200 that may be presented to and experienced by a user at a venue. For instance, the venue may be the same as venue 190 of FIG. 1. Notably, FIG. 2 illustrates different AR content that may be presented in different forms and with respect to different types of offers and/or information to present to the user. For instance, as described above, areas in the venue may further be designated with categories for specific types of patrons (e.g., a stand and cheer section (or a "superfan" section), a visiting team section, a family zone/family section, etc.). In this case, additional AR content may be provided by the AR server and presented via the user's AR viewer indicating these area/section designations (e.g., where the AR content may comprise color coded indicators, shading or highlighting, overlay text rendered on/over the associated section(s) or other zone(s), etc.). Thus, for instance, as illustrated in FIG. 2, the "superfan section" is shaded or highlighted and includes a text box that indicates "Superfan section $25, 4 available"; the "family zone" occupies part of Section 5 and is shaded or highlighted and includes a text box that indicates "Family zone, 12 seats available, $45"; the visiting team zone occupies part of section 4 and is shaded or highlighted and includes overlay text that indicates "Visiting team, $25-$75, many available."

FIG. 2 further illustrates that the user may be presented with offers for specific seats. For instance, the user may be present within Section 3 of the venue, or may be close enough to Section 3 (and with Section 3 within the field of view) such that more detailed offer information may be useful and discernable to the user. For example, the AR content may include a text box with the text "Buy this seat $75," which may clearly indicate the seat to which the offer pertains (e.g., due to the proximity of the user to the particular seat). Similarly, another offer may be presented as AR content in the form of a text box that indicates "Buy these seats $40 each." For instance, an AR content server, such as server(s) 125 of FIG. 1, may personalize offers for the user based upon the user profile and other available data, such as information that the user has previously purchased two tickets and is likely with a companion such that any upgrade would need to include two seats. In one example, only offers for adjacent seats of sufficient quantity may be presented to a user. In one example, the venue app of the user's mobile computing device may provide configurable options to allow the user to select to see offers for individual seats, even if the user is known to be part of a group.

FIG. 2 further illustrates an example in which AR content may include an offer for the user to upgrade a seat for less than all of an event at the venue. For instance, the AR content may include a text box indicating "Section 5 Row 1 Seat 2, $7^{th}$ inning upgrade, $15," where the text box may include a pointer to the seat. In connection with any of the examples in FIG. 2, the offers may be personalized to the user, the user may accept one or more of the offers via a variety of input types, the AR content may change as a result of the acceptance (or declination) of any offers, and so forth.

FIG. 3 illustrates further example AR views 310 and 320 that may be presented to and experienced by users at a venue. The AR view 310 may be in the same Section 3 as illustrated in FIGS. 1 and 2. However, a user may be in the middle of Section 3 in a particular row and at or in a particular seat. In this case, the AR view 310 may include offers for a seat at cost of $75 or two seats for $40. These may be the same offers illustrated in AR view 200 of FIG. 2. However, the AR view 310 may further include an offer to buy a current seat for $35. The user may accept the offer, for example, by sitting down in the seat and remaining in the seat for more than a threshold period of time, such as one minute, two minutes, five minutes, etc., or via any number of forms of input, such as voice command, gesture input, pressing a button via a GUI of a touchscreen of an accompanying smartphone, and so forth. On the other hand, the user may continue to move throughout Section 3 and may instead select the $75 seat, the two $40 seats (e.g., if the user is with a companion), and so forth.

As further illustrated in FIG. 3, the AR view 320 may be presented to and experienced by a member of the venue staff/personnel via this person's AR viewer. For instance, as described above, the staff member may view an area of the venue, such as a seating section, which may be recorded as video via an outward facing camera of the AR viewer. The video image(s) may be analyzed either at the AR viewer, at an associated mobile computing device of the staff member, or at an AR server to detect vacant and occupied seats. If a seat is determined to be occupied via visual analysis, then a ticketing database may be accessed to determine if a ticket was sold for the seat. If so, and if the user is sharing the location of the user's mobile computing device and it matches with the location of the seat, then no violation is recorded. However, if the user is not at his or her seat, but the seat is occupied, then a potential violation is detected. In such case, the AR server may send AR content to cause the staff member's AR display to present a visual indicator of the seat where a potential violation is detected (e.g., again via highlighting, one or more arrows pointing toward the seat, overlay text of the section, row, and seat number, etc.). For instance, as illustrated in the AR view 320 of FIG. 3, a text box pointing toward a seat may include the text "potential seat violation." Similarly, if the seat was not sold but it is detected to be occupied, then a potential violation may likewise be declared and alerted to the staff member via the AR content. Seat occupation may also be determined via weight sensors or other sensors if the venue's seats are so equipped and in communication with the AR server. In one example, more detailed information may be provided as the staff member approaches the seat, such as the name of the rightful ticketholder, the section, row, and seat number (e.g., so there is no confusion as to the exact seat in question), and so forth. In another example, additional information regarding the seat and its occupant and/or the rightful ticketholder may be presented as additional overlay AR content, e.g., on the side of the field of view in an information bar, or the like.

In a next example, AR view 330 may be for an entirely different type of venue, e.g., a theme park. In particular, AR view 330 illustrates that other examples of the present disclosure are applicable to different types of permission zones besides seats. In this case, a user may be a theme park and may have a ticket or access level that permits the user to be in one or more permission zones. However, the theme park may include a "water zone" that is designated as a separate permission zone to which the user has not previously purchased or otherwise obtained authorization to access. In this case, the user may be presented with an offer via AR content that describes the condition(s) in order to gain access to the water zone. For example, the user may be offered to spend three resort credits to access the water zone. For instance, the user may be staying at accommodations associated with the theme park that grant the user a number of "resort tokens or credits" that the user may trade while at the theme park in order to obtain food, skip lines, gain access to additional permission zones, and so forth. In this example, the user may agree to the offer via any of a number of types of inputs, such as via a voice command, etc., or by entering the water zone, which may be detected via a GPS unit of the user's mobile computing device/AR viewer, via wireless beacons/sensors deployed throughout the theme park, and so on. It should be noted that the same or similar offers for permission zone access via AR content may be utilized in examples in connection with seating or standing room at outdoor or indoor concerts, festivals, or the like, access to events or rooms in conference venues, access to standing room zones in stadiums, arenas, theaters, or the like, or access to zones in such venues without reserved seating (e.g., a user may pay to access a certain level of seating, but within such permission zone, the seats may be first come, first served), and so forth. Thus, these and other modifications are all contemplated within the scope of the present disclosure.

FIG. 4 illustrates a flowchart of an example method 400 for presenting via an augmented reality endpoint device first visual information associated with at least one condition to access a permission zone. In one example, steps, functions and/or operations of the method 400 may be performed by a device or apparatus as illustrated in FIG. 1, e.g., by one or more of server(s) 125 and/or server(s) 112, or any one or more components thereof, or by server(s) 125 or servers 112, and/or any one or more components thereof in conjunction with one or more other components of the system 100, such as elements of wireless access network 115, telecommunication network 110, mobile computing device 141, and so forth. In one example, the steps, functions, or operations of method 400 may be performed by a computing device or processing system, such as computing system 500 and/or hardware processor element 502 as described in connection with FIG. 5 below. For instance, the computing system 500 may represent any one or more components of the system 100 that is/are configured to perform the steps, functions and/or operations of the method 400. Similarly, in one example, the steps, functions, or operations of the method 400 may be performed by a processing system comprising one or more computing devices collectively configured to perform various steps, functions, and/or operations of the method 400. For instance, multiple instances of the computing system 400 may collectively function as a processing system. For illustrative purposes, the method 400 is described in greater detail below in connection with an example performed by a processing system. The method 400 begins in step 405 and may proceed to optional step 410 or to step 420.

At optional step 410, the processing system may determine that another user has relinquished an authorization to access a permission zone. For instance, in one example, the processing system may detect that the other user has left the user's seat and exited the venue, and similarly with respect to other types of permission zones and other types of access levels (such as a room having a maximum occupancy, where the other user has given up the authorization to access the permission zone such that another slot may be offered to others).

At step 420, the processing system detects a location and an orientation of an augmented reality endpoint device of a user at a venue. In one example, the location and the orientation of the augmented reality endpoint device are obtained from the augmented reality endpoint device. For instance, the processing system may comprise a server, or servers for an AR venue app or service for permission zone access and management that obtains the location information from the augmented reality endpoint device. In another example, the processing system may track the location of the augmented reality endpoint device within the venue, such as via wireless beacons. In still another example, the processing system may comprise the augmented reality endpoint device itself.

At step 430, the processing system identifies a permission zone of the venue within a field of view of the augmented reality endpoint device in accordance with the location and the orientation of the augmented reality endpoint device. The permission zone may comprise, for example, at least one seat at the venue, at least one location for standing or sitting within the venue, one of a plurality of zones of the venue (e.g., where the one of the plurality of zones comprises less than all of the venue), and so forth. In one example, the plurality of zones may comprise seating sections of the venue. In one example, the plurality of zones may comprise zones of a hotel, theme park, club, casino, cruise ship, or the like.

At step 440, the processing system determines at least one condition for the user to access the permission zone. In one example, the at least one condition may be personalized to the user. For instance, the processing system may identify that the user has a particular status as a patron of the venue (e.g., frequent user status) such that a discounted cost of accessing the permission zone may be offered to the user, e.g., as compared to other users/patrons without such status. However, in another instance, the at least one condition may be the same for all users. In such case, step 440 may include confirming that the at least one condition is current. For example, as other users may change seats or the number of users accessing permission zones change, the offer(s) for accessing such permission zone(s) may also change (or may become available or be taken away). The at least one condition may be any number of conditions such as noted above, and may include non-monetary conditions, such as the user agreeing to spend money elsewhere, using non-monetary credits that are associated with the venue and that are possessed by the user, giving up access to one or more other permission zones (e.g., the user vacating or otherwise agreeing to relinquish access to a previously reserved seat so that the seat can be offered to others), and so forth. In one example, the determining the at least one condition for the user to access the permission zone may be performed in response to determining that the other user has relinquished the authorization. For instance, the processing system may identify at optional step 410 that another user has left an event at the venue and that a seat or another permission zone is now available for the duration of the event to be offered to the user and/or to other users.

At step 450, the processing system presents, via the augmented reality endpoint device, first visual information (e.g., AR content) associated with the at least one condition for the user to access the permission zone, where the first visual information associated with the at least one condition is presented within the field of view and comprises at least one feature indicative of an association with the permission zone. The at least one feature indicative of the association with the permission zone may comprise, for example, at least one of: a placement of the first visual information overlapping with the permission zone within the field of view, a pointer directed at the permission zone within the field of view (e.g., an arrow, a portion of a text box, etc.), a same color-coding of the permission zone and the first visual information, a same shading of the permission zone and the first visual information, a changing visual pattern applied to the permission zone in conjunction with a proximity of the first visual information, or the like. In one example, the first visual information may further identify a category of the first permission zone, e.g., family friendly, visiting team, etc.

As noted above, in one example, the processing system may comprise the augmented reality endpoint device. In such case, a server may send various data to the augmented reality endpoint device, where the augmented reality endpoint device/processing system may determine its location and orientation, and may then select which AR content to present from among the AR content already available locally on the AR endpoint device. Alternatively, or in addition, the processing system may transmit its location and orientation information to the server, in response to which the server may provide corresponding AR content for display via the augmented reality endpoint device/processing system. In still another example where the processing system does not comprise the augmented reality endpoint device (e.g., where the processing system comprises one or more AR servers), step 450 may include sending or transmitting the AR content to the augmented reality endpoint device, e.g., with instructions as to when and where within the field of view to present the AR content.

At optional step 460, the processing system may obtain, via the augmented reality endpoint device, an input indicating an acceptance of the at least one condition for the user to access the permission zone. The input may comprise, for example, a voice command, a gesture input, pressing a button via a GUI of a touchscreen of an accompanying smartphone, and so forth. The input may be interpreted on the augmented reality endpoint device or at a server of the processing system depending upon the architecture implemented for a particular example in connection with the method 400.

At optional step 470, the processing system may present at least a second visual information indicative of an authorization to access the permission zone, in response to the obtaining of the input. For instance, the processing system may previously have included AR content for the user comprising an indication of the user's seat. However, since the user's seat may have changed as a result of the acceptance of the at least one condition, the processing system may then provide AR content indicating the user's new seat, and similarly with regard to other types of permission zones.

In one example, following step 450, or following one of the optional steps 460 or 470, the processing system may return to step 410 and continue to the following steps to subsequently detect a second location and a second orientation of the augmented reality endpoint device at the venue, identify a second permission zone of the venue within a second field of view of the augmented reality endpoint device in accordance with the second location and the second orientation of the augmented reality endpoint device, determine at least one second condition for the user to access the second permission zone, and present, via the augmented reality endpoint device, second visual information associated with the at least one second condition for the user to access the second permission zone and so on. In such case, the second visual information associated with the at least one second condition may be presented within the second field of view and may comprise at least one second feature indicative of an association with the second permission zone.

In addition, in one example, the processing system may continue through a subsequent iteration of the method 400 to optional step 460 to obtain, via the augmented reality endpoint device, an input indicating an acceptance of the at least one second condition for the user to access the second permission zone. In addition, the processing system may continue to optional step 470 to present at least a second visual information indicative of an authorization to access the second permission zone, in response to the obtaining of the input. In one example, the permission zone may comprise one of a plurality of seating sections of the venue, and the second permission zone may comprise at least one seat within the one of the plurality of seating sections of the venue. In addition, in such an example, the at least one condition in the first visual information may comprise a range of costs for seats in the one of the plurality of seating sections, and the at least one second condition in the second visual information may comprise a cost for the at least one seat. For example, the user may first be relatively far away from the seat and more general information regarding the entire section of seats may be presented. The user may then approach closer to the seat, in response to which more detailed information specific to the seat may be presented. Alternatively, or in addition, the at least one condition in the first visual information may comprise a duration of time that the user is permitted to enter the first permission zone without cost.

At optional step 480, the processing system may detect that a second location of the augmented reality endpoint device of the user is in a portion of the venue that the user is not authorized. For instance, the second location may be determined from a GPS unit of the user's augmented reality endpoint device, via detection of the user's augmented reality endpoint device via one or more wireless beacons at the venue, and/or using one or more seat sensors to detect seat occupancy in conjunction with localization of the augmented reality endpoint device of the user, and so on.

At optional step 490, the processing system may present, via at least one of the augmented reality endpoint device or an endpoint device of a venue management personnel, at least one notification that the user is in the portion of the venue that the user is not authorized. For instance, AR content comprising a visual indicator such as "you are not authorized for this area" or "you have not purchased this seat" may be presented via the user's augmented reality endpoint device. Alternatively, or in addition, the same or similar information may be conveyed to the user as audio data presented via a headset or speaker of the augmented reality endpoint device. The venue management personnel may also be provided with notification, which may be in the form of AR visual content presented via an AR display of the venue management personnel (e.g., as illustrated in AR view 330 of FIG. 3).

Following step 450 or one of optional steps 460-490, the method 400 may proceed to step 495. At step 495, the method 400 ends.

It should be noted that the method 400 may be expanded to include additional steps, or may be modified to replace steps with different steps, to combine steps, to omit steps, to perform steps in a different order, and so forth. For instance, in one example, the processing system may repeat one or more steps of the method 400, such as step 420-450, or steps 410-450 on an ongoing basis as the user moves throughout the venue, and similarly for multiple users, for different events at the same venue, and so forth. In one example, the method 400 may further include the processing system releasing a prior seat or other permission zones of the user in response to obtaining the input at optional step 460, e.g., in a seat/permission zone database, where a limited number of authorizations per permission zone are maintained in the seat/permission zone database (e.g., one per seat, 10 per box, 1000 per section of amusement park), etc. In one example, the method 400 may include charging the user for the permission zone as an additional permission zone, charging the user for an upgrade of seat or other types of permission zone, making a prior seat or other types of permission zone access available for others, and so on (e.g., via updates to a seating database and/or a ticketing and reservation database). In various other examples, the method 400 may further include or may be modified to comprise aspects of any of the above-described examples in connection with FIGS. 1-3, or as otherwise described in the present disclosure. Thus, these and other modifications are all contemplated within the scope of the present disclosure.

In addition, although not expressly specified above, one or more steps of the method 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 5 depicts a high-level block diagram of a computing system 500 (e.g., a computing device or processing system) specifically programmed to perform the functions described herein. For example, any one or more components, devices, and/or systems illustrated in FIG. 1 or described in connection with FIGS. 2-4, may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where the hardware processor element 502 may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for presenting via an augmented reality endpoint device first visual information associated with at least one condition to access a permission zone, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, the computing system 500 may employ a plurality of hardware processor elements. Furthermore, although only one computing device is shown in FIG. 5, if the method(s) as discussed above is implemented in a distributed or parallel manner for a particular illustrative example, e.g., the steps of the above method(s) or the entire method(s) are implemented across multiple or parallel computing devices, then the computing system 500 of FIG. 5 may represent each of those multiple or parallel computing devices. Furthermore, one or more hardware processor elements (e.g., hardware processor element 502) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 505 for presenting via an augmented reality endpoint device first visual information associated with at least one condition to access a permission zone (e.g., a software program comprising computer-executable instructions) can be loaded into memory 504 and executed by hardware processor element 502 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 502) executing the computer-readable instructions relating to the above described method(s) can be perceived as a programmed processor or a specialized processor. As such, the present module 505 for presenting via an augmented reality endpoint device first visual information associated with at least one condition to access a permission zone (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
   detecting, by a processing system including at least one processor, a location and an orientation of an augmented reality endpoint device of a user at a venue;
   identifying, by the processing system, a permission zone of the venue within a field of view of the augmented reality endpoint device in accordance with the location and the orientation of the augmented reality endpoint device;
   determining, by the processing system, at least one condition for the user to access the permission zone;
   presenting, by the processing system via the augmented reality endpoint device, first visual information associated with the at least one condition for the user to access the permission zone, wherein the first visual information associated with the at least one condition is presented within the field of view and comprises at least one feature indicative of an association with the permission zone;
   detecting, by the processing system, a second location and a second orientation of the augmented reality endpoint device at the venue;
   identifying, by the processing system, a second permission zone of the venue within a second field of view of the augmented reality endpoint device in accordance with the second location and the second orientation of the augmented reality endpoint device;
   determining, by the processing system, at least one second condition for the user to access the second permission zone; and
   presenting, by the processing system via the augmented reality endpoint device, second visual information associated with the at least one second condition for the user to access the second permission zone, wherein the second visual information associated with the at least one second condition is presented within the second field of view and comprises at least one second feature indicative of an association with the second permission zone.

2. The method of claim 1, wherein the location and the orientation of the augmented reality endpoint device are obtained from the augmented reality endpoint device.

3. The method of claim 1, wherein the at least one feature indicative of the association with the permission zone comprises at least one of:
   a placement of the first visual information overlapping with the permission zone within the field of view;
   a pointer directed at the permission zone within the field of view;
   a same color-coding of the permission zone and the first visual information;
   a same shading of the permission zone and the first visual information; or
   a changing visual pattern applied to the permission zone in conjunction with a proximity of the first visual information.

4. The method of claim 1, wherein the permission zone comprises at least one of:
   at least one seat at the venue;
   at least one location for standing or sitting within the venue; or
   one of a plurality of zones of the venue, wherein the one of the plurality of zones comprises less than all of the venue.

5. The method of claim 4, wherein the plurality of zones comprises seating sections of the venue.

6. The method of claim 5, wherein the first visual information further identifies a category of each zone of the plurality of zones.

7. The method of claim 1, wherein the processing system comprises the augmented reality endpoint device.

8. The method of claim 1, further comprising:
   obtaining, via the augmented reality endpoint device, an input indicating an acceptance of the at least one condition for the user to access the permission zone.

9. The method of claim 8, further comprising:
   presenting at least a third visual information indicative of an authorization to access the permission zone, in response to the obtaining of the input.

10. The method of claim 1, further comprising:
    obtaining, via the augmented reality endpoint device, an input indicating an acceptance of the at least one second condition for the user to access the second permission zone.

11. The method of claim 10, further comprising:
    presenting at least a third visual information indicative of an authorization to access the second permission zone, in response to the obtaining of the input.

12. The method of claim 1, wherein the permission zone comprises one of a plurality of seating sections of the venue, and wherein the second permission zone comprises at least one seat within the one of the plurality of seating sections of the venue.

13. The method of claim 12, wherein the at least one condition comprises a range of costs for seats in the one of the plurality of seating sections, and wherein the at least one second condition comprises a cost for the at least one seat.

14. The method of claim 12, wherein the at least one condition comprises a duration of time that the user is permitted to enter the permission zone without cost.

15. The method of claim 1, wherein the user is permitted to access at least a portion of the venue not including the permission zone in accordance with a prior authorization, the method further comprising:
    determining that another user has relinquished an authorization to access the permission zone.

16. The method of claim 15, wherein the determining the at least one condition for the user to access the permission zone is performed in response to the determining that the another user has relinquished the authorization.

17. The method of claim 1, further comprising:
detecting a third location of the augmented reality endpoint device of the user is in a portion of the venue that the user is not authorized; and
presenting, via at least one of: the augmented reality endpoint device or an endpoint device of a venue management personnel, at least one notification that the user is in the portion of the venue that the user is not authorized.

18. A non-transitory computer-readable medium storing instructions which, when executed by a processing system including at least one processor, cause the processing system to perform operations, the operations comprising:
detecting a location and an orientation of an augmented reality endpoint device of a user at a venue;
identifying a permission zone of the venue within a field of view of the augmented reality endpoint device in accordance with the location and the orientation of the augmented reality endpoint device;
determining at least one condition for the user to access the permission zone;
presenting, via the augmented reality endpoint device, first visual information associated with the at least one condition for the user to access the permission zone, wherein the first visual information associated with the at least one condition is presented within the field of view and comprises at least one feature indicative of an association with the permission zone;
detecting a second location and a second orientation of the augmented reality endpoint device at the venue;
identifying a second permission zone of the venue within a second field of view of the augmented reality endpoint device in accordance with the second location and the second orientation of the augmented reality endpoint device;
determining at least one second condition for the user to access the second permission zone; and
presenting, via the augmented reality endpoint device, second visual information associated with the at least one second condition for the user to access the second permission zone, wherein the second visual information associated with the at least one second condition is presented within the second field of view and comprises at least one second feature indicative of an association with the second permission zone.

19. An apparatus comprising:
a processing system including at least one processor; and
a computer-readable medium storing instructions which, when executed by the processing system, cause the processing system to perform operations, the operations comprising:
detecting a location and an orientation of an augmented reality endpoint device of a user at a venue;
identifying a permission zone of the venue within a field of view of the augmented reality endpoint device in accordance with the location and the orientation of the augmented reality endpoint device;
determining at least one condition for the user to access the permission zone;
presenting, via the augmented reality endpoint device, first visual information associated with the at least one condition for the user to access the permission zone, wherein the first visual information associated with the at least one condition is presented within the field of view and comprises at least one feature indicative of an association with the permission zone;
detecting a second location and a second orientation of the augmented reality endpoint device at the venue;
identifying a second permission zone of the venue within a second field of view of the augmented reality endpoint device in accordance with the second location and the second orientation of the augmented reality endpoint device;
determining at least one second condition for the user to access the second permission zone; and
presenting, via the augmented reality endpoint device, second visual information associated with the at least one second condition for the user to access the second permission zone, wherein the second visual information associated with the at least one second condition is presented within the second field of view and comprises at least one second feature indicative of an association with the second permission.

20. The apparatus of claim 19, wherein the location and the orientation of the augmented reality endpoint device are obtained from the augmented reality endpoint device.

* * * * *